US 6,278,978 B1

(12) United States Patent
Andre et al.

(10) Patent No.: US 6,278,978 B1
(45) Date of Patent: *Aug. 21, 2001

(54) AGENT SCHEDULING SYSTEM AND METHOD HAVING IMPROVED POST-PROCESSING STEP

(75) Inventors: David Andre, Berkeley, CA (US); Illah Nourbakhsh, Pittsburgh, PA (US)

(73) Assignee: Blue Pumpkin Software, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,219

(22) Filed: Apr. 7, 1998

(51) Int. Cl.[7] .................................................. G06F 17/60
(52) U.S. Cl. ............................................................ 705/9
(58) Field of Search ....................... 705/7, 8, 9; 235/376; 364/468.06, 468.08; 395/672, 826, 677, 557, 670; 706/13

(56) References Cited

U.S. PATENT DOCUMENTS

| 4,700,295 | | 10/1987 | Katsof et al. ........................ 364/401 |
|-----------|---|---------|---------------------------------------------|
| 5,111,391 | * | 5/1992  | Fields et al. .............................. 705/9 |
| 5,195,172 | * | 3/1993  | Elad et al. ............................... 706/62 |
| 5,233,533 | | 8/1993  | Edstrom et al. ........................ 364/468 |
| 5,319,781 | * | 6/1994  | Syswerda ................................ 395/650 |
| 5,325,292 | * | 6/1994  | Crockett ................................... 705/9 |
| 5,329,444 | | 7/1994  | Takahashi et al. ..................... 364/401 |
| 5,369,570 | * | 11/1994 | Parad ....................................... 705/8 |
| 5,826,236 | * | 10/1998 | Narimatsu et al. ...................... 705/8 |
| 5,848,403 | * | 12/1998 | Gabriner et al. ........................ 706/13 |
| 5,890,134 | * | 3/1999  | Fox ........................................... 705/9 |
| 5,897,629 | * | 4/1999  | Shinagawa et al. .................... 706/13 |
| 5,943,652 | * | 8/1999  | Sisley et al. ............................. 705/9 |
| 5,963,913 | * | 10/1999 | Henneuse et al. ....................... 705/9 |
| 6,038,539 | * | 3/2000  | Maruyama et al. ..................... 705/8 |
| 6,216,109 | * | 4/2001  | Zweben et al. .......................... 705/8 |

FOREIGN PATENT DOCUMENTS

0514122 A * 11/1992 (EP) .

OTHER PUBLICATIONS

Sprout, Alison L., "Scheduling Your Forces with a PC," Fortune, vol. 129, No. 11, p. 131, May, 1994.*
Heck, Mike, "High–End Project Managers," InfoWorld, vol. 15, No. 5, pp. 59–70, Feb. 1993.*
"Harlequin: Harlequin Announces Visionary Adaptive Workflow Strategy for Digital Printing and Publishing," M2 Presswire, p. N/A, Oct. 1996.*

(List continued on next page.)

Primary Examiner—Tariq R. Hafiz
Assistant Examiner—Susanna Meinecke-Diaz
(74) Attorney, Agent, or Firm—Lumen Intellectual Property Services, Inc.

(57) ABSTRACT

A method for improving an agent schedule comprises unscheduling an agent from a shift in the schedule; evaluating a score function for each of a plurality of possible schedules which have the agent scheduled for different possible shifts; and selecting an improved schedule from among the plurality of possible schedules. The improved schedule is characterized by an improved value of the score function. The above steps are repeated until a locally optimal schedule is obtained. The break times in the possible shifts are not necessarily scheduled in the above procedure. In another aspect of the invention, a method is provided for optimal break scheduling. The method includes the steps of unscheduling a break; evaluating a score function for a plurality of possible break times for the break; and selecting an improved break time from the possible break times. The improved break time is characterized by an improved score. In the above procedures, the evaluation of the score function for a possible schedule includes selecting, for each interval in the possible schedule, one of a plurality of predetermined values corresponding to distinct staffing levels.

16 Claims, 1 Drawing Sheet

OTHER PUBLICATIONS

Dobson, Ricardo, "PeopleScheduler Plus Adds Graphics to Schedules," PC Magazine, vol. 14, No. 9, p. 49(1), May, 1995.*

Heck, Mike & Tom Young, "New Tools For an Old Need," InfoWorld, vol. 16, No. 40, pp. 68–83, Oct. 1994.*

Marshall, Patrick, "PeopleScheduler Finds Unique Niche in Scheduling Workers," InfoWorld, vol. 16, No. 24, p. 113, Jun. 1994.*

"Corporate Profile for Blue Pumpkin Software," Business Wire, p. 10101029, Oct. 10, 1997.*

Davis, Jessica, "ICCM Showcases Call–Centers Apps," InfoWorld, vol. 19, No. 36, p. 57, Sep. 8, 1997.*

"Teloquent and Blue Pumpkin Announce OEM Agreement," Business Wire, p. 08271190, Aug. 27, 1997.*

* cited by examiner

AGENT SCHEDULING SYSTEM AND METHOD HAVING IMPROVED POST-PROCESSING STEP

FIELD OF THE INVENTION

This invention relates to computer systems and computer-implemented methods for generating and optimizing schedules for a collection of agents. In particular, the invention relates to methods for optimizing agent schedules to satisfy variable staffing requirements and shift constraints.

BACKGROUND OF THE INVENTION

The task of creating an efficient schedule for a collection of agents is known to be a very complex constraint satisfaction problem. The problem becomes even more complex when the number of agents is large, or when there are variable constraints upon the shifts such as the number of breaks within an agent's shift, the scheduling of the breaks within a shift, and the lengths of the breaks.

Traditionally, scheduling is performed manually. Because the manual preparation of schedules is very laborious, however, computerized scheduling methods have been devised to perform the task of scheduling. Although computerized scheduling is far faster than manual scheduling, it often does not produce schedules that make the most efficient use of agents. One major reason for the difficulty in producing efficient schedules is that the scheduling problem is a computational problem of type NP-complete, i.e. the only known algorithms to solve the problem require an amount of time that grows exponentially with the size of the problem. There are no known algorithms, therefore, which can perfectly solve the scheduling problem in less than exponential time. The problem of generating a good schedule, therefore, requires computational techniques for maximizing the schedulers efficiency while minimizing the amount of computational time, and inherently involves trade-offs that are peculiar to each specific application.

U.S. Pat. No. 5,195,172 issued Mar. 16, 1993 to Elad et al. discloses a method for solving a broad class of problems, which includes scheduling problems. The method makes use of techniques from operations research and artificial intelligence. Because the method is a general-purpose problem-solving algorithm, however, it does not provide techniques to address the problems specifically associated with optimizing agent schedules. In other words, while the techniques disclosed by Elad may provide a small improvement to conventional scheduling techniques, they are too general to provide a fast and effective method for efficient agent scheduling.

U.S. Pat. No. 5,369,570 issued Nov. 29, 1994 to Parad discloses adjusting a resource schedule to adapt it to changing conditions, needs, and requirements. The method is directed to the scheduling of general resources, and the concept of schedule repair is accordingly limited to a very general context. The problem of agent scheduling, on the other hand, brings with it special constraints and associated complexities. While the disclosed method may solve certain problems of a general nature related to efficient scheduling, specific problems associated with optimizing agent scheduling are not addressed.

U.S. Pat. No. 5,111,391 issued May 5, 1992 to Fields et al. discloses a skill-based staff scheduling system, which is largely concerned with agent placement within existing or fixed schedules. As a result of this lack of flexibility, it is not able to produce a well-optimized schedule which allows for the variation of other parameters.

U.S. Pat. No. 5,325,292 issued Jun. 28, 1994 to Crockett discloses a method for agent scheduling which includes a post-processing step for optimization. The post-processing step allows for changes in break times, swapping shifts for preferences, and eliminating unnecessary tours. Because it does not allow for many other possible schedule changes, however, the disclosed method is less than ideal. By unnecessarily fixing many attributes of the schedule, it can not always find a more optimal schedule. For example, the post-processing step does not allow a single agent to exchange shifts and does not allow the day that an agent works to be changed. The post-processing also does not allow more than one agent to be simultaneously rescheduled. These limitations, as well as others, contribute to the production of a less than optimal agent schedule. Moreover, the post-processing step is blindly iterated a fixed number of times. As a result, computational time is spent in an attempt to optimize the schedule regardless of whether or not the schedule is likely to benefit from another iteration.

OBJECTS AND ADVANTAGES OF THE INVENTION

Accordingly, it is a primary object of the present invention to overcome the limitations of the prior art agent scheduling methods. More specifically, it is an object of the invention to provide a fast, efficient and flexible computer-implemented method for optimizing an agent schedule.

SUMMARY OF THE INVENTION

These objects and advantages are attained by a novel computer-implemented method for improving an agent schedule. The method is distinguished from the prior art by numerous advantageous features. For example, the method includes swapping shift patterns and not just shift start times, completely unscheduling an agent and not just modifying an agent schedule, using a unique and very simple score for evaluating the desirability of a schedule, and scoring schedules that have unscheduled, or indeterminate, break times. The method is also characterized by the use of an asymmetric scoring function having a stochastic factor. In contrast with prior art methods, the present invention is able to find the locally best schedule.

The method for improving an agent schedule comprises the following steps: unscheduling an agent from a shift in the schedule; evaluating a score function for each of a plurality of possible schedules which have the agent scheduled for different possible shifts; and selecting an improved schedule from among the plurality of possible schedules. The improved schedule is characterized by an improved value of the score function. The above steps are repeated until a locally optimal schedule is obtained. The break times in the possible shifts are not necessarily scheduled in the above procedure.

In another aspect of the invention, a method is provided for locally optimal break scheduling. The method includes the steps of unscheduling a break; evaluating a score function for a plurality of possible break times for the break; and selecting an improved break time from the possible break times. The improved break time is characterized by an improved score.

In the above procedures, the evaluation of the score function for a possible schedule includes selecting, for each interval in the possible schedule, one of a plurality of predetermined values corresponding to distinct staffing levels. In an preferred embodiment, the plurality of predetermined values comprises four values corresponding to whether the interval in the possible schedule is very understaffed, slightly understaffed, slightly overstaffed, or very overstaffed.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
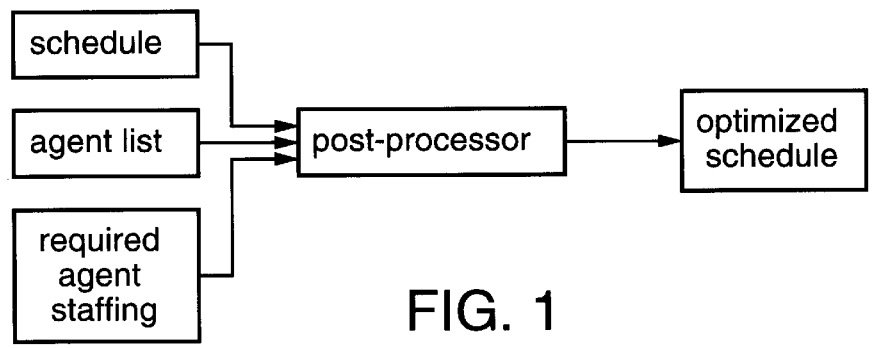
FIG. 1 is a block diagram indicating the input to and output of a post-processor operating in accordance with the method of the present invention.

FIG. 1 is a block diagram indicating the input to and output of a post-processor operating in accordance with the method of the present invention. In a preferred embodiment, the post-processor is a workstation or other electronic computer executing a post-processing program. The post-processor is provided with a schedule, an agent list, and required agent staffing data. The initial schedule may be generated by a conventional scheduling program which also allows a user to specify the agent list and agent staffing requirements. The post-processor then generates from the preliminary schedule an optimized schedule in accordance with the present invention.

Figure 2:
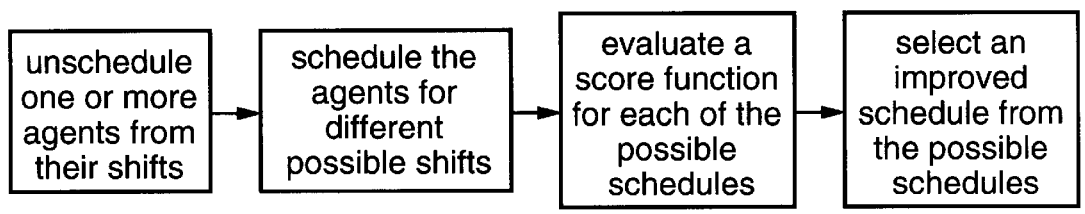
FIG. 2 is a flow chart outlining the main steps performed by an agent schedule post-processor in accordance with the present invention.

As illustrated in FIG. 2, the post-processor is programmed to perform the following steps:

a) unschedule one or more agents from their shifts in the schedule, so that their shifts are empty;

b) reschedule the agents, or a portion of the agents, for different possible shifts, so that various possible schedules are formed;

c) evaluate a score function for each of the possible schedules; and d) based on the scores, select an improved schedule from among the possible schedules.

In the preferred embodiment, the above steps are repeated until a locally optimal schedule is obtained. An important aspect of the invention is that it is possible to perform the above agent rescheduling while leaving specific break times indeterminate. To provide further optimization, the post-processor may additionally repeat a set of break rescheduling steps, as follows:

e) unschedule one or more breaks;

f) reschedule the breaks for different possible break times;

g) evaluate a score function for the schedules having the various possible break times; and h) based on the scores, select improved break times from the possible break times.

In the preferred embodiment, the score function for a possible schedule includes selecting one of a plurality of predetermined values corresponding to distinct staffing levels for an interval in the possible schedule. The predetermined values comprise four values corresponding to whether the interval in the possible schedule is very understaffed, slightly understaffed, slightly overstaffed, or very overstaffed. The score function in the preferred embodiment also includes the calculation of a small stochastic factor that helps the post-processor find an optimal local minimum.

Figure 3:
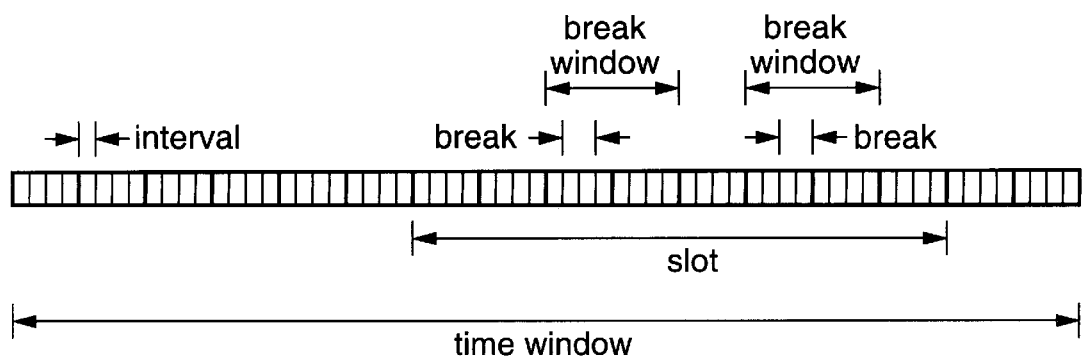
FIG. 3 is a diagram illustrating the relationship of various scheduling terms used in accordance with the present invention.

The following definitions of scheduling terms are used in the present description. FIG. 3 is a diagram illustrating the relationship of some of these terms. A day is a 24-hour period of time, starting at midnight. A time window is a continuous period of time having a specified day, start time, and length (e.g. Oct. 1, 1998, 9am, 8 hours). For the purpose of scheduling, time is quantized into intervals of length interval length, e.g. 15 minutes. In particular, an interval is a time window having a length equal to an interval length. A break pattern includes a number of breaks, and for each break, a break length and a number of possible break offset values (e.g. 2 breaks, 30 minutes each, starting at 2.0 hours, 2.5 hrs., 3.0 hrs., 4.0 hrs., 4.5 hrs., or 5.0 hrs.). All times are represented internally as a whole number of interval lengths. A slot is a time window and an associated break pattern, i.e. a time during which an agent might work and have a specified pattern of breaks. An agent is a set of data corresponding to a person or resource employed to satisfy staffing requirements. The set of data includes minimum and maximum number of intervals per week that the agent is required to work, a number of assigned intervals, and a set of slots for which the agent is available for work. A shift is an agent, a slot, and a break offset value for each break in the slot. In other words, a shift is a particular assignment of an agent to a slot with certain breaks. A shift can be manually locked to prevent the post-processing procedure from rescheduling it. Similarly, any particular break can be locked so that it will not be rescheduled. Agent requirements are the ideal staffing requirements for the schedule, i.e. the number of agents required to be working during each interval of the schedule. A schedule is a set of shifts, arranged by agent and day. An overstaffing limit for an interval is a maximum number of agents that should be scheduled for the interval in excess of the agent requirement for the interval. An understaffing limit for any interval is a maximum number of agents that should be scheduled for the interval short of the agent requirement for the interval.

The post-processing procedure for optimizing a schedule will now be described in detail. The procedure includes a loop which iterates a schedule optimization routine until either a maximum number of iterations is exceeded, or the last iteration has not improved the schedule. The post-processing loop normally results in a locally optimal schedule. Provided the maximum number of iterations is sufficiently large, the procedure is guaranteed to result in a locally optimal schedule. The maximum number of iterations condition is designed to ensure that the post-processing terminates in the case of stochastic scoring or an unstable attractor. The input to the loop is a list of agents, an agent schedule, and a list of agent requirements, i.e. required staffing levels for each interval of each day in the schedule. The output from the post-processing loop is an optimized schedule for the agents. The following pseudo-code describes the details of the method in terms of the above defined terms.

PRIMARY LOOP:

Loop until no Change made in Schedule or Maximum Iterations is exceeded:

Loop over each Shift in the Schedule:

If the Shift is unlocked then

Unschedule the Agent for the Shift
Loop over each Slot in the Schedule:
  If Agent can work in the Slot then
  Calculate Score with the Agent in the Slot
Keep track of the Best Score and the Best Slot
If Useful to Schedule the Agent in the Best Slot then
  Schedule Agent for the Best Slot
  Note if Change was made to Schedule
Loop over each Shift in the Schedule:
  Loop over each Break in the Shift:
  If Break is unlocked then
    Loop over each Start Time for the Break:
    Calculate Score with this Start Time for the Break
    Keep track of the Best Score and Best Start Time
    Schedule Break at Best Start Time
    Note if Change was made to Schedule The above basic loop calls various functions in order to perform the specific steps described in the loop. These functions are described in detail below, and their pseudo-code is provided.

CanWork(Agent,Slot): This function checks to see if the given agent can work in the given slot. In particular, it checks to make sure that the agent does not go over a maximum number of hours per week, that the agent is available to work for the slot, and that the agent is not already working on the day of the slot.

CanWork:
  If the Agent is available to work in the Slot then
    If the Agent would not be over-scheduled by taking the Slot then
      The Agent Can Work the Slot Score(Slot): This function calculates a score of how desirable it is to fill this slot, based on the staffing requirements of each interval within the time window of the slot. It loops over the intervals of the slot, and scores them. This function deals with unscheduled breaks by assigning to all intervals in the break window the regular interval score times the ratio of break length to break window length.

ScoreSlot:
  Loop over each Interval in the Slot
  Calculate the Interval Score
  If Stochastic Scoring is On then
    Scale Interval Score by Gaussian Random Number (mean 1.0, SD 0.1)
  If Interval is in a Break Window then
    Scale Interval Score by Break Length/No. Intervals in Break Window
  Add Interval Score to SlotScore The regular score for each interval in the slot may be calculated as follows:

ScoreInterval:
  If Agents Scheduled in Interval<Agent Requirement−Understaffing Limit then Score=10
  If Agent Requirement−Understaffing Limit<=Agents Scheduled in Interval and Agents Scheduled in Interval<Agent Requirement then Score=1
  If Agent Requirement=Agents Scheduled in Interval then Score=0
  If Agent Requirement<Agents Scheduled in Interval<= Agent Requirement+Overstaffing Limit then Score=−1
  If Agent Requirement+Overstaffing Limit<Agents Scheduled in Interval then Score=−10

Useful(Best_Slot,Agent): This function determines whether the schedule as a whole would be better off if this slot were filled by this agent. If the agent is under the agent's minimum number of hours per week, then the slot is useful, or if the slot's score is positive, then it is useful.

Useful:
  If the Agent is under-scheduled or the Best Score is positive then
    It is Useful to Schedule the Agent in the Slot Score(Break_Start): This function calculates a score for a break and start time based on how much under/overstaffing the break would cause. For each interval in the break, a score is calculated (similarly to the score for an interval in Score(Slot) above). These scores are summed, and then returned. In this case, "better" means to have a lower score.

ScoreBreak:
  Loop over each Interval in the Break
  Calculate the Interval Score
  Add Interval Score to Break Score Stochastic scoring is preferably used to improve the post-processing method. This technique randomly pushes the schedule out of small local minima and helps the algorithm to find more highly optimized schedules. In this case a Gaussian noise perturbation is added to one or both of the scoring functions, where the noise is adjusted to decrease in magnitude as the number of iterations of the post-processing loop increases.

It will be clear to one skilled in the art that the above embodiment may be altered or supplemented in many ways without departing from the scope of the invention. For example, instead of rescheduling one shift at a time, multiple shifts and/or multiple agents can be simultaneously rescheduled. This will allow for a more extensive search of the space of schedules. The algorithm in this case is modified to randomly select some set of non-locked shifts and/or agents and unschedule them. It then reschedules each agent in the best available slot and recalculates all the breaks. Additional variations will be obvious to those skilled in the art. Accordingly, the scope of the invention should be determined by the following claims and their legal equivalents.

What is claimed is:

1. A computer-implemented method of optimizing a schedule for scheduling a plurality of agents, the method comprising the following steps:
  a) acquiring an initial schedule created by any means;
  b) removing a shift from the schedule, thereby creating a shift-reduced schedule, wherein the shift comprises an agent, a time slot, and at least one break offset value, wherein the schedule comprises a plurality of shifts assigning the agents to time slots and to break offset values;
  c) adding an array of different possible shifts individually to the shift-reduced schedule, thereby creating a plurality of possible schedules, wherein the possible shifts are break-unspecified shifts and have indeterminate break times;
  d) evaluating a score function for each of the plurality of possible schedules, wherein the possible schedules have different possible shifts added, wherein the different possible shifts comprise all time slots in the schedule for which the agent can work;
  e) selecting an improved schedule from among the plurality of possible schedules, wherein the improved schedule is characterized by an improved value of the score function; and
scheduling the agents in accordance with the improved schedule.

2. The method of claim 1 further comprising repeating steps (b), (c), (d), and (e) until a locally optimal schedule is obtained.

3. The method of claim 1 further comprising:
- f) unscheduling at least one break to make the breaks indeterminate, thereby creating at least one break-unspecified shift;
- g) for each break-unspecified shift, adding an array of different possible break offset values, thereby creating a plurality of possible break times;
- h) for each break-unspecified shift, evaluating a score function for each of the plurality of possible break times; and
- i) selecting a schedule having improved break times from the possible schedules having possible break times, wherein the improved break times are characterized by improved scores.

4. The method of claim 3 further comprising repeating steps (b) through (i) until a locally optimal schedule is obtained.

5. The method of claim 1 wherein the evaluation of the score function for a possible schedule includes the calculation of a stochastic factor.

6. The method of claim 1 wherein the evaluation of the score function for a possible schedule includes selecting one of a plurality of predetermined values corresponding to distinct staffing levels for an interval in the possible schedule.

7. The method of claim 6 wherein the plurality of predetermined values comprises four values corresponding to whether the interval in the possible schedule is very understaffed, slightly understaffed, slightly overstaffed, or very overstaffed.

8. A computer-implemented method of optimizing a schedule for scheduling a set of agents, the method comprising the following steps:
- a) acquiring an initial schedule created by any means;
- b) removing a plurality of shifts from the schedule, thereby creating a shift-reduced schedule, wherein the plurality of shifts comprise a subset of agents assigned to a subset of slots and a subset of break offset values;
- c) adding an array of different possible shifts individually to the shift-reduced schedule, thereby creating a plurality of possible schedules, wherein the possible shifts are break-unspecified shifts and have indeterminate break times;
- d) evaluating a score function for each of the plurality of possible schedules, wherein the possible schedules have different possible shifts added, wherein the different possible shifts comprise a portion of the subset of agents and all time slots in the schedule for which the agents can work;
- e) selecting an improved schedule from among the plurality of possible schedules, wherein the improved schedule is characterized by an improved value of the score function; and scheduling the agents in accordance with the improved schedule.

9. The method of claim 8 further comprising repeating steps (b), (c), (d), and (e) until a locally optimal schedule is obtained.

10. The method of claim 8 further comprising:
- f) unscheduling at least one break to make said breaks indeterminate, thereby creating at least one break-unspecified shift;
- g) for each break-unspecified shift, adding an array of different possible break offset values, thereby creating a plurality of possible break times;
- h) for each break-unspecified shift, evaluating a score function for each of the plurality of possible break times; and
- i) selecting a schedule having improved break times from the possible schedules having possible break times, wherein the improved break times are characterized by improved scores.

11. The method of claim 10 further comprising repeating steps (b) through (i) until a locally optimal schedule is obtained.

12. The method of claim 8 wherein the evaluation of the score function for a possible schedule includes the calculation of a stochastic factor.

13. The method of claim 8 wherein the evaluation of the score function for a possible schedule includes selecting one of a plurality of predetermined values corresponding to distinct staffing levels for an interval in the possible schedule.

14. The method of claim 13 wherein the plurality of predetermined values comprises four values corresponding to whether the interval in the possible schedule is very understaffed, slightly understaffed, slightly overstaffed, or very overstaffed.

15. A computer-implemented method of optimizing a schedule for scheduling a set of agents, the method comprising the following steps:
- a) generating a preliminary schedule from an agent list and agent staffing requirements specified by a user, wherein the schedule comprises a plurality of shifts assigning the agents to slots and to break offset values;
- b) removing from the preliminary schedule a first shift comprising a first agent;
- c) generating a plurality of possible schedules having zero or more different possible shifts added, wherein the different possible shifts comprise the first agent and all time slots in the schedule for which the first agent can work, and wherein the different possible shifts are break-unspecified shifts and have indeterminate break times;
- d) evaluating a score function for each of the possible schedules based on the indeterminate break times;
- e) selecting an improved schedule from among the plurality of possible schedules, wherein the improved schedule is characterized by an improved value of the score function; and
- f) scheduling the agents in accordance with the improved schedule.

16. The method of claim 15 further comprising removing from the preliminary schedule a second shift comprising a second agent, wherein the different possible shifts comprise the second agent and all time slots in the schedule for which the second agent can work, and scheduling the second agent.

* * * * *